US010839234B2

(12) United States Patent
Wang

(10) Patent No.: US 10,839,234 B2
(45) Date of Patent: Nov. 17, 2020

(54) SYSTEM AND METHOD FOR THREE-DIMENSIONAL (3D) OBJECT DETECTION

(71) Applicant: TuSimple, Inc., San Diego, CA (US)

(72) Inventor: Panqu Wang, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 136 days.

(21) Appl. No.: 16/129,040

(22) Filed: Sep. 12, 2018

(65) Prior Publication Data
US 2020/0082180 A1 Mar. 12, 2020

(51) Int. Cl.
*H04N 7/00* (2011.01)
*G06K 9/00* (2006.01)
(Continued)

(52) U.S. Cl.
CPC ...... *G06K 9/00805* (2013.01); *G06F 16/29* (2019.01); *G06N 20/00* (2019.01); *G06T 7/62* (2017.01); *G06T 7/80* (2017.01)

(58) Field of Classification Search
USPC ...... 382/100, 103–108, 153–155, 157, 168, 382/173, 181, 189, 199, 209, 219, 224, (Continued)

(56) References Cited

U.S. PATENT DOCUMENTS

| 6,777,904 B1 | 8/2004 | Degner |
| 7,103,460 B1 | 9/2006 | Breed |

(Continued)

FOREIGN PATENT DOCUMENTS

| EP | 1754179 A1 | 2/2007 |
| EP | 2448251 A2 | 5/2012 |

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

(Continued)

*Primary Examiner* — Seyed H Azarian
(74) *Attorney, Agent, or Firm* — Paul Liu; Perkins Coie, LLP

(57) ABSTRACT

A system and method for three-dimensional (3D) object detection is disclosed. A particular embodiment can be configured to: receive image data from at least one camera associated with an autonomous vehicle, the image data representing at least one image frame; use a trained deep learning module to determine pixel coordinates of a two-dimensional (2D) bounding box around an object detected in the image frame; use the trained deep learning module to determine vertices of a three-dimensional (3D) bounding box around the object; use a fitting module to obtain geological information related to a particular environment associated with the image frame and to obtain camera calibration information associated with the at least one camera; and use the fitting module to determine 3D attributes of the object using the 3D bounding box, the geological information, and the camera calibration information.

18 Claims, 23 Drawing Sheets

(51) Int. Cl.
    *G06T 7/80*     (2017.01)
    *G06T 7/62*     (2017.01)
    *G06N 20/00*     (2019.01)
    *G06F 16/29*     (2019.01)

(58) Field of Classification Search
    USPC ....... 382/232, 254, 274, 276, 285–291, 305,
                      382/312; 1/1; 348/113, 116
    See application file for complete search history.

(56) References Cited

U.S. PATENT DOCUMENTS

| | | |
|---|---|---|
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Bemtorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2015/0062304 A1 | 3/2015 | Stein |
| 2015/0353082 A1 | 12/2015 | Lee |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0321381 A1 | 11/2016 | English |
| 2016/0375907 A1 | 12/2016 | Erban |
| 2018/0137642 A1 | 5/2018 | Malisiewicz |
| 2018/0348346 A1* | 12/2018 | Vallespi-Gonzalez ...................... G01S 17/931 |
| 2019/0317510 A1* | 10/2019 | Ros Sanchez ....... G05D 1/0221 |
| 2019/0333389 A1* | 10/2019 | Wang .................. G06K 9/00798 |
| 2019/0354786 A1* | 11/2019 | Lee ......................... G06N 7/005 |
| 2019/0392212 A1* | 12/2019 | Sawhney ........... G06K 9/00201 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

(56) References Cited

OTHER PUBLICATIONS

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineenng, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtaINIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, The Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Song, Shiyu et al. "Joint SFM and detection cues for monocular 3D localization in road scenes." IEEE Conference on Computer Vision and Pattern Recognition (CVPR), IEEE, Jun. 7, 2015, pp. 3734-3742.
Viegas Da Cruz, Isabel. International Application No. PCT/US2019/056004, International Search Report and Written Opinion dated Feb. 27, 2020, (12 pages).

\* cited by examiner

US 10,839,234 B2

SYSTEM AND METHOD FOR THREE-DIMENSIONAL (3D) OBJECT DETECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2017-2018, TuSimple, All Rights Reserved.

TECHNICAL FIELD

This patent document pertains generally to tools (systems, apparatuses, methodologies, computer program products, etc.) for image processing, vehicle control systems, and autonomous driving systems, and more particularly, but not by way of limitation, to a system and method for three-dimensional (3D) object detection.

BACKGROUND

Object detection is a fundamental problem for numerous vision tasks, including object tracking, semantic instance segmentation, and object behavioral prediction. Detecting all objects in a traffic environment, such as cars, buses, pedestrians, and bicycles, is crucial for building an autonomous driving system. Failure to detect an object (e.g., a car or a person) may lead to malfunction of the motion planning module of an autonomous driving car, thus resulting in a catastrophic accident. As such, object detection for autonomous vehicles is an important operational and safety issue.

Deep learning-based 2D object detection models have been successfully applied to a variety of computer vision tasks, including face detection, instance segmentation, point cloud processing, and autonomous driving. Given an input image, the goal of 2D object detection is to output the category label and the location (using a rectangular bounding box) of all objects of interest. However, because all operations are performed on the 2D image plane, conventional models can only get the relative location information (in pixels) rather than the absolute value (in meters). This behavior produced by conventional 2D models is not desired for a modern autonomous driving system, as losing the exact location (and potentially car dimensionality) significantly impairs the output quality of the perception module, thus impacting the execution of the subsequent motion planning and control modules and producing potential hazards.

SUMMARY

A system and method for three-dimensional (3D) object detection are disclosed. The example system and method for 3D object detection can include a 3D image processing system configured to receive image data from at least one camera associated with an autonomous vehicle. An example embodiment can be configured to output the location of a 2D bounding box around a detected object, and the location of the eight corners that depict the size and direction (heading) of the object. This is an improvement over conventional systems that do not provide real-world 3D information. With geological information related to a particular environment (e.g., road or terrain information) and camera calibration matrices, the example embodiment can accurately calculate the exact size and location of the object imaged by the camera in 3D coordinates. The example embodiment runs in real-time and serves as a crucial component in the autonomous driving perception system.

In the various embodiments described herein, a 3D image processing module is configured to solve the aforementioned issues. The 3D image processing module, as described herein, can be used to obtain the 3D attributes of an object, including its length, height, width, 3D spatial location (all in meters) in the camera coordinate space, and the moving direction (heading) of the object. In an example embodiment, the 3D image processing module includes two sub-modules, namely; 1) a deep learning module that learns the pixel coordinates of the 2D bounding box and all vertices of the 3D bounding box in the image plane; and 2) a fitting module that solves the 3D attributes using geological information from a terrain map and camera information including camera calibration matrices with camera extrinsic and intrinsic matrices. The 3D object detection module can run in real-time across multiple cameras and can significantly contribute to the perception pipeline and improve the robustness and the safety level of an autonomous driving system. Details of the various example embodiments are provided below.

BRIEF DESCRIPTION OF THE DRAWINGS

The various embodiments are illustrated by way of example, and not by way of limitation, in the figures of the accompanying drawings in which:

FIG. 3 illustrates the wide-angle images of the first set of images as processed by the deep learning module of an example embodiment; FIG. 4 illustrates the wide-angle images of the first set of images as processed by the fitting module of an example embodiment;

FIG. 5 illustrates the medium-range images of the first set of images as processed by the deep learning module of an example embodiment; FIG. 6 illustrates the medium-range images of the first set of images as processed by the fitting module of an example embodiment;

FIG. 7 illustrates the long-range images of the first set of images as processed by the deep learning module of an example embodiment; FIG. 8 illustrates the long-range images of the first set of images as processed by the fitting module of an example embodiment;

FIG. 9 illustrates the wide-angle images of the second set of images as processed by the deep learning module of an example embodiment; FIG. 10 illustrates the wide-angle images of the second set of images as processed by the fitting module of an example embodiment;

FIG. 11 illustrates the medium-range images of the second set of images as processed by the deep learning module of an example embodiment; FIG. 12 illustrates the medium-range images of the second set of images as processed by the fitting module of an example embodiment;

FIG. 13 illustrates the long-range images of the second set of images as processed by the deep learning module of an example embodiment; FIG. 14 illustrates the long-range images of the second set of images as processed by the fitting module of an example embodiment;

FIG. 15 illustrates the wide-angle images of the third set of images as processed by the deep learning module of an example embodiment; FIG. 16 illustrates the wide-angle images of the third set of images as processed by the fitting module of an example embodiment;

FIG. 17 illustrates the medium-range images of the third set of images as processed by the deep learning module of an example embodiment; FIG. 18 illustrates the medium-range images of the third set of images as processed by the fitting module of an example embodiment;

FIG. 19 illustrates the long-range images of the third set of images as processed by the deep learning module of an example embodiment; FIG. 20 illustrates the long-range images of the third set of images as processed by the fitting module of an example embodiment;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for three-dimensional (3D) object detection are disclosed. The example system and method for 3D object detection can include a 3D image processing system configured to receive image data from at least one camera associated with an autonomous vehicle. The 3D image processing system, as described herein, can be used to obtain the 3D attributes of an object detected in the image data, including the object's length, height, width, 3D spatial location (all in meters) in the camera coordinate space, and the moving direction (heading) of the object. Details of the various example embodiments are provided below.

An example embodiment disclosed herein can be used in the context of an in-vehicle control system 150 in a vehicle ecosystem 101. In one example embodiment, an in-vehicle control system 150 with a 3D image processing module 200 resident in a vehicle 105 can be configured like the architecture and ecosystem 101 illustrated in FIG. 1. However, it will be apparent to those of ordinary skill in the art that the 3D image processing module 200 described and claimed herein can be implemented, configured, and used in a variety of other applications and systems as well.

Figure 1:
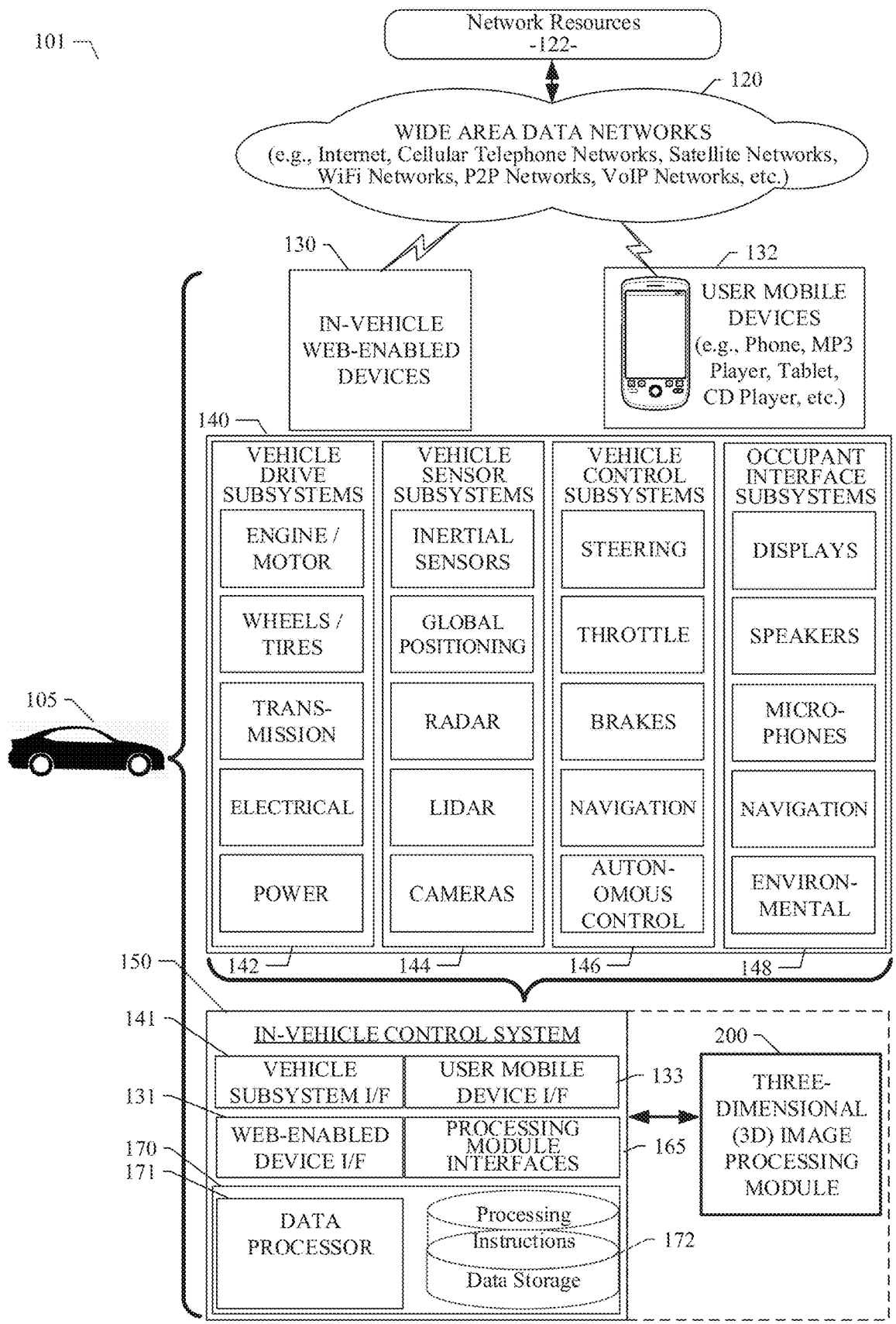
FIG. 1 illustrates a block diagram of an example ecosystem in which an in-vehicle image processing module of an example embodiment can be implemented.

Referring now to FIG. 1, a block diagram illustrates an example ecosystem 101 in which an in-vehicle control system 150 and a 3D image processing module 200 of an example embodiment can be implemented. These components are described in more detail below. Ecosystem 101 includes a variety of systems and components that can generate and/or deliver one or more sources of information/data and related services to the in-vehicle control system 150 and the 3D image processing module 200, which can be installed in the vehicle 105. For example, one or more cameras installed in or on the vehicle 105, as one of the devices of vehicle subsystems 140, can generate image and timing data that can be received by the in-vehicle control system 150. One or more of the cameras installed in or on the vehicle 105 can be equipped with various types of camera lenses (e.g., wide-angle or close-range lenses, medium-range lenses, and long-range lenses) to capture images of the environment around the vehicle 105. The in-vehicle control system 150 and the 3D image processing module 200 executing therein can receive this image and timing data input. As described in more detail below, the 3D image processing module 200 can process the image input and enable the generation of 3D information associated with object features in the images, which can be used by an autonomous vehicle control subsystem, as another one of the subsystems of vehicle subsystems 140. The autonomous vehicle control subsystem, for example, can use the real-time 3D information associated with the object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the 3D image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, camera parameters, terrain data, and data processing instructions. A processing module interface 165 can be provided to facilitate data communications between the data processor 171 and the 3D image processing module 200. In various example embodiments, a plurality of processing modules, configured similarly to 3D image processing module 200, can be provided for execution by data processor 171. As shown by the dashed lines in FIG. 1, the 3D image processing module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the 3D image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the 3D image processing module 200 can receive web-based data or content via an in-vehicle web-enabled device interface 131, which can be used to connect with the in-vehicle web-enabled device receiver 130 and network 120. In this manner, the in-vehicle control system 150 and the 3D image processing module 200 can support a variety of network-connectable in-vehicle devices and systems from within a vehicle 105.

As shown in FIG. 1, the in-vehicle control system 150 and the 3D image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the 3D image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the 3D image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the 3D image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the 3D image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the 3D image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the 3D image processing module 200, move in a controlled manner, or follow a path or trajectory based on output generated by the 3D image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and 3D image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the 3D image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the 3D image processing module 200 can be implemented as in-vehicle components of vehicle 105. In various example embodiments, the in-vehicle control system 150 and the 3D image processing module 200 in data communication therewith can be implemented as integrated components or as separate components. In an example embodiment, the software components of the in-vehicle control system 150 and/or the 3D image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Three-Dimensional (3D) Object Detection

A system and method for three-dimensional (3D) object detection are disclosed. The example system and method for 3D object detection can include a 3D image processing system 210 configured to receive image data from at least one camera associated with an autonomous vehicle. An example embodiment can be configured to output the location of a 2D bounding box around a detected object, and the location of the eight corners that depict the size and direction (heading) of the object. As such, the example embodiments can obtain the 3D attributes of an object detected in the image data. This is an improvement over conventional systems that do not provide real-world 3D information. With geological information related to a particular environment (e.g., road or terrain information) and camera calibration matrices, the example embodiment can accurately calculate the exact size and location of the object imaged by the camera in 3D coordinates. The camera calibration matrices can correspond to the manner in which a particular camera is installed on a vehicle and the configuration and orientation of the images produced by the camera. The example embodiment runs in real-time and serves as a crucial component in the autonomous driving perception system.

In the various embodiments described herein, a 3D image processing module 200 of the 3D image processing system 210 (see FIG. 21) is configured to solve the aforementioned issues. The 3D image processing module 200, as described herein, can be used to obtain the 3D attributes of an object, including its length, height, width, 3D spatial location (all in meters) in the camera coordinate space, and the moving direction (heading) of the object. In an example embodiment, the 3D image processing module 200 can include two submodules, namely; 1) a deep learning module 212 that learns the pixel coordinates of the 2D bounding box and all vertices of the 3D bounding box in the image plane; and 2) a fitting module 214 that solves the 3D attributes using geological information from a terrain map and camera information including camera calibration matrices with camera extrinsic and intrinsic matrices. A camera extrinsic matrix denotes the coordinate system transformations from 3D world coordinates to 3D camera coordinates. A camera intrinsic matrix denotes the coordinate system transformations from 3D camera coordinates to 2D image coordinates. The deep learning module 212 and the fitting module 214 are described in more detail below and in connection with FIG. 21. The 3D image processing module 200 can run in real-time across multiple cameras and can significantly contribute to the perception pipeline and improve the robustness and the safety level of an autonomous driving system. Details of the various example embodiments are provided below.

In an example embodiment, the 3D object detection problem can be defined as follows:
Given an input image I, for each object $O_i$ in the object list $O=\{O_1, O_2, \ldots, O_n\}$, output the following vector:

$$O_i = \{x_{top}, y_{top}, x_{bottom}, y_{bottom}, x_{3d,1}, y_{3d,1}, \ldots, x_{3d,8}, y_{3d,8}, h, w, l, X, Y, Z, \theta\},$$

Where xs and ys are the pixel value in the image plane; top and bottom denotes the top-left and bottom-right corners that defines the 2D bounding box; $x_{3d}s$ and $y_{3d}s$ are the eight vertices of the projected 3D bounding boxes on the 2D image plane. The remaining values are just the 3D properties of the bounding box, including its height (h), width (w), length (l), location in the 3D world relative to the camera (X, Y, Z), and the heading orientation of the bounding box ($\theta$).

Figure 2:
FIG. 2 illustrates a sample image showing the two-dimensional (2D) and three-dimensional (3D) bounding box of a vehicle in the image plane.

FIG. 2 illustrates a sample image showing the two-dimensional (2D) and three-dimensional (3D) bounding box of an object (e.g., a vehicle) in the image plane as produced by the 3D image processing module 200 of an example embodiment. In the example of FIG. 2, an object (e.g., a vehicle) is shown with its 2D bounding box (in yellow) and its 3D bounding box (in green) as produced by the 3D image processing module 200 as described herein.

In an example embodiment of the 3D image processing module 200, the deep learning module 212 is used for learning the projected 3D bounding boxes in the image plane. The fitting module 214 uses the output of the deep learning module 212 with the input of corresponding camera matrices and terrain map data to produce the 3D attributes of objects in an input set of images. The deep learning module 212 and the fitting module 214 are described in more detail below.

Deep Learning Module for 3D Bounding Box Generation

Deep learning-based methods for learning 2D bounding boxes are mature and have been the state-of-the-art method for years. Typically, machine learning systems or neural networks are used to implement these deep learning-based methods. However, such deep learning-based methods for 3D object bounding boxes have not been employed in conventional systems. In the example embodiments described herein, the deep learning module 212 increases the number of points to be regressed (e.g., from 2 corners in a 2D model to 8 vertices in a 3D model). In the example embodiment of the deep learning module 212, a new branch is added for learning the x and y coordinates for all projected vertices of the 3D bounding box. The new branch can be trained jointly with an original 2D object detection architecture. In the example embodiment, the task weight for classification, the 2D bounding box regression, and the 3D bounding box regression is set by default to (1:1:1). All ground truths can be obtained through human annotation, and the order of the eight points can be predefined to facilitate feature learning. During inference training of the deep learning module 212, sets of training images can be input to the network (e.g., a neural network) of the deep learning module 212, and all x and y coordinates for the 2D and 3D bounding boxes of every object in the images can be obtained. Non-maximum suppression (NMS) is also applied after the training of the deep learning module 212 to refine the bounding boxes and improve the prediction quality. The deep learning module 212 can run in real-time at 40 fps (frames per second) for a single image, which satisfies the requirements of an autonomous driving system.

Fitting Module

The goal of the fitting module 214 in an example embodiment is to lift the bounding box on the 2D image plane to the 3D space and obtain the 3D absolute attributes of an object in the camera 3D coordinate space, including the object's height, width, length, distance to the camera, and orientation. Directly lifting the 2D information to the 3D coordinate space is highly challenging in the autonomous driving environment; because, 1) the fitting module 214 cannot use a flat-ground assumption as the roadway in a typical driving environment always has slopes (ups and downs), and 2) the initial camera extrinsic matrices are not always reliable as severe vibrations may occur during driving. To solve the first issue, the fitting module 214 can use a pre-calculated or previously obtained terrain map containing accurate global positioning system (GPS) locations with the height of the terrain from which the fitting module 214 can obtain accurate geographical information associated with the input images. To solve the second issue, the fitting module 214 can use the output of an online calibration module, so the camera matrices are corrected on-the-fly. In this manner, the severe vibrations experienced by the autonomous vehicle can be corrected with respect to the camera matrices.

The 3D bounding box fitting process performed by the fitting module 214 of an example embodiment is described below:

---
3D bounding box fitting process:
---
1: procedure FITTING( image, bboxes):
2:　　Obtain camera extrinsic matrix T and intrinsic matrix K.
3:　　for each bbox in bboxes do
4:　　　　Obtain the terrain value v.
5:　　　　Set the origin to the bottom center of the bbox, get the coordinates of all eight points.
6:　　　　Transform the bbox to camera coordinates using T.
7:　　　　Project the eight points to the image plane using K.
8:　　　　Solve the fitting problem using the least square algorithm with the prior v.
9:　　end for
10:　　Return 3Dbboxes
11: end procedure In the 3D bounding box fitting process described above, the camera matrices (T and K) and terrain value v are obtained through a calibration data source (e.g., an online calibration module) and a terrain map data source, respectively. In essence, the fitting module 214 of an example embodiment is configured to minimize the difference between the output value of the eight points corresponding to an object from the deep learning module 212 and the projected value of the eight points from the 3D world as produced by the fitting module 214 while maintaining the assumption that the object is represented as a cuboid in a 3D space. By solving the fitting problem, the fitting module 214 can obtain the optimal value of the unknown 3D attributes of an object in an image and recover the 3D attributes of the object in 3D space. To improve the robustness of the least square algorithm used in an example embodiment, the fitting module 214 can use predefined bounds for some of the variables, such as the height, width, and length of a vehicle object. For example, predefined bounds for the variables of a vehicle object can be all greater than 1 meter and less and 50 meters. The solution of the fitting process as described herein is highly accurate and can be applied in a multi-camera tracking scenario as well. The average processing speed for the fitting module 214 in an example embodiment is approximately 2 milliseconds per image, which only adds a little overhead to the whole system and can satisfy the requirements of autonomous driving systems.

Sample illustrations of the 3D object detection data results 220 produced by an example embodiment are shown in FIGS. 3 through 20 and described below.

Figure 3:
FIGS. 3 and 4 illustrate a first sample set of images including images from a wide-angle camera.
Figure 4:

FIGS. 3 and 4 illustrate a first sample set of images including images from a wide-angle camera; FIG. 3 illustrates the wide-angle images of the first set of images as processed by the deep learning module 212 of an example embodiment; FIG. 4 illustrates the wide-angle images of the first set of images as processed by the fitting module 214 of an example embodiment.

Figure 5:
FIGS. 5 and 6 illustrate the first sample set of images including images from a medium-range camera.
Figure 6:

FIGS. 5 and 6 illustrate the first sample set of images including images from a medium-range camera; FIG. 5 illustrates the medium-range images of the first set of images as processed by the deep learning module 212 of an example embodiment; FIG. 6 illustrates the medium-range images of the first set of images as processed by the fitting module 214 of an example embodiment.

Figure 7:
FIGS. 7 and 8 illustrate the first sample set of images including images from a long-range camera.
Figure 8:

FIGS. 7 and 8 illustrate the first sample set of images including images from a long-range camera; FIG. 7 illustrates the long-range images of the first set of images as processed by the deep learning module 212 of an example embodiment; FIG. 8 illustrates the long-range images of the first set of images as processed by the fitting module 214 of an example embodiment.

In the first sample set of images shown in FIGS. 3 through 8, the cameras are facing in the same direction. Because different cameras of an autonomous vehicle may have different fields of view and detection ranges, the same object may occur at different locations in the image plane. For example, the vehicle in the middle of the medium-range camera image (see FIGS. 5 and 6) appears at the top-half of the wide-angle camera image (see FIGS. 3 and 4) and the bottom left corner of the long-range camera image (see FIGS. 7 and 8). FIGS. 3, 5, and 7 show the results of the processing performed by the deep learning module 212. FIGS. 4, 6, and 8 show the projected results generated by the fitting module 214. FIGS. 3, 5, and 7 each show green bounding boxes that denote the result of 2D object detection. FIGS. 3 through 8 each show blue cubes around the detected objects, wherein the blue cubes denote the results of the 3D detection produced by the 3D image processing module 200 as described herein. In FIGS. 3 through 8, the numbers written in yellow color illustrate the order of the eight vertices for 3D detection. The illustrated examples only show the bottom four vertices and omit the top vertices for simplicity. In FIGS. 4, 6, and 8, the fitting results are obtained by projecting the calculated 3D properties back to the 2D image plane. For each bounding box, the red text describes the calculated 3D object properties in the following order: vehicle height, width, length, distance (in z axis), and the orientation. For example, the middle vehicle shown in FIG. 6 has a height of 1.6 meters, a width of 2.0 meters, a length of 3.7 meters, a distance of 28.4 meters, and an orientation of −88.5 degrees. The orientation of an object is measured as the angle between the object heading and the camera x axis. If an object is heading forward with the same direction as the autonomous vehicle 105, the orientation angle will be −90 degrees. It can be clearly seen from the example images shown that the 3D image processing module 200 as described herein can obtain accurate measurement data for the 3D object properties even if the object is over 200 meters away from the autonomous vehicle 105. The 3D image processing module 200 can also effectively handle situations such as significant occlusion (see FIGS. 3 and 4) and partial observation (see FIGS. 3, 4, 7 and 8).

Figure 9:
FIGS. 9 and 10 illustrate a second sample set of images including images from a wide-angle camera.
Figure 10:
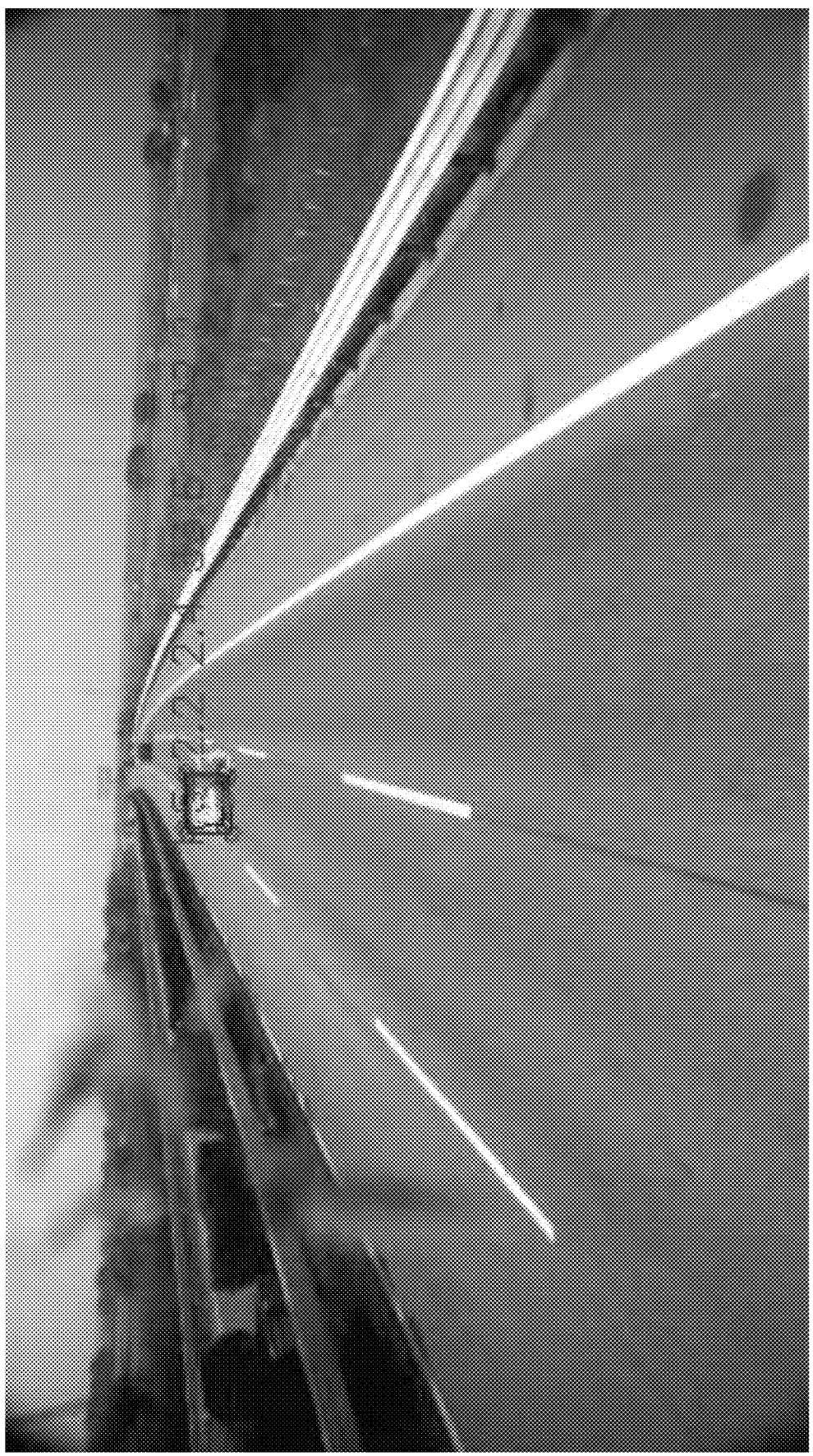

FIGS. 9 and 10 illustrate a second sample set of images including images from a wide-angle camera; FIG. 9 illustrates the wide-angle images of the second set of images as processed by the deep learning module 212 of an example embodiment; FIG. 10 illustrates the wide-angle images of the second set of images as processed by the fitting module 214 of an example embodiment.

Figure 11:
FIGS. 11 and 12 illustrate the second sample set of images including images from a medium-range camera.
Figure 12:

FIGS. 11 and 12 illustrate the second sample set of images including images from a medium-range camera; FIG. 11 illustrates the medium-range images of the second set of images as processed by the deep learning module 212 of an example embodiment; FIG. 12 illustrates the medium-range images of the second set of images as processed by the fitting module 214 of an example embodiment.

Figure 13:
FIGS. 13 and 14 illustrate the second sample set of images including images from a long-range camera.
Figure 14:
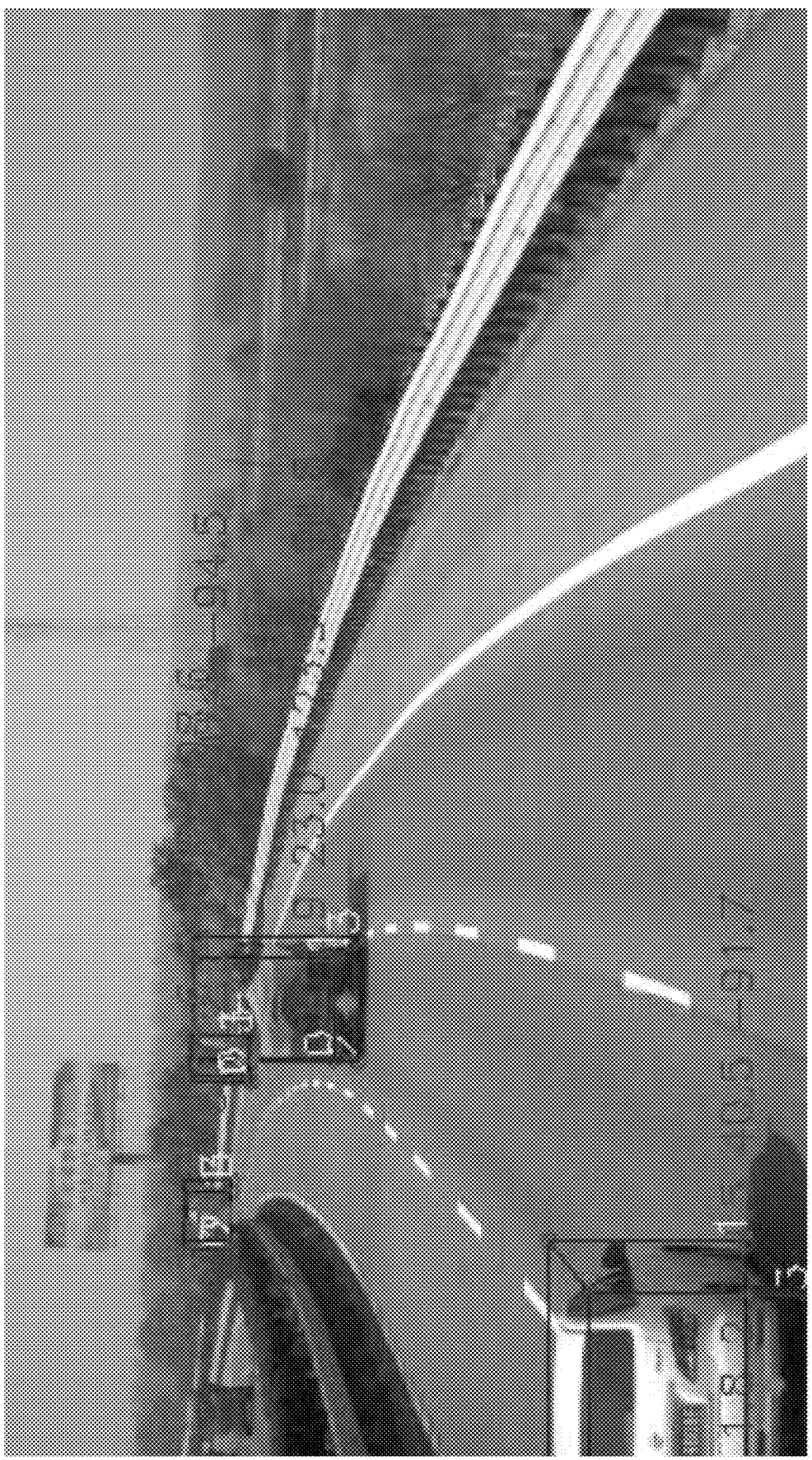

FIGS. 13 and 14 illustrate the second sample set of images including images from a long-range camera; FIG. 13 illustrates the long-range images of the second set of images as processed by the deep learning module 212 of an example embodiment; FIG. 14 illustrates the long-range images of the second set of images as processed by the fitting module 214 of an example embodiment.

Figure 15:
FIGS. 15 and 16 illustrate a third sample set of images including images from a wide-angle camera.
Figure 16:

FIGS. 15 and 16 illustrate a third sample set of images including images from a wide-angle camera; FIG. 15 illustrates the wide-angle images of the third set of images as processed by the deep learning module 212 of an example embodiment; FIG. 16 illustrates the wide-angle images of the third set of images as processed by the fitting module 214 of an example embodiment.

Figure 17:
FIGS. 17 and 18 illustrate the third sample set of images including images from a medium-range camera.
Figure 18:

FIGS. 17 and 18 illustrate the third sample set of images including images from a medium-range camera; FIG. 17 illustrates the medium-range images of the third set of images as processed by the deep learning module 212 of an example embodiment; FIG. 18 illustrates the medium-range images of the third set of images as processed by the fitting module 214 of an example embodiment.

Figure 19:
FIGS. 19 and 20 illustrate the third sample set of images including images from a long-range camera.
Figure 20:

FIGS. 19 and 20 illustrate the third sample set of images including images from a long-range camera; FIG. 19 illustrates the long-range images of the third set of images as processed by the deep learning module 212 of an example embodiment; FIG. 20 illustrates the long-range images of the third set of images as processed by the fitting module 214 of an example embodiment.

Figure 21:
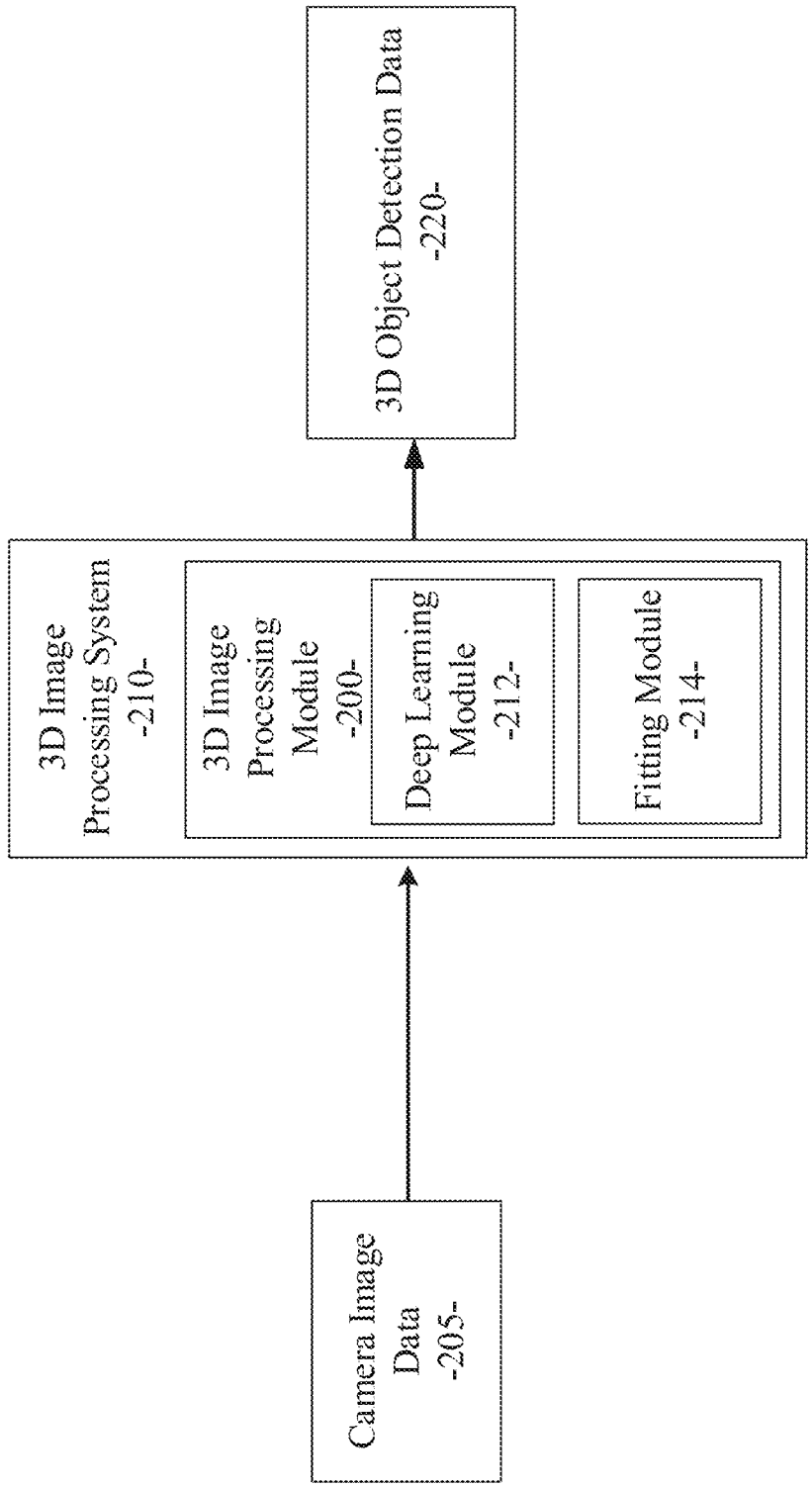
FIG. 21 illustrates an example embodiment as used in the context of a 3D image processing system for autonomous vehicles.

Referring now to FIG. 21, an example embodiment disclosed herein can be used in the context of a 3D image processing system 210 for autonomous vehicles. The 3D image processing system 210 can include, be included in, execute, or be executed by the 3D image processing module 200 as described above. The 3D image processing system 210 can include the deep learning module 212, and the fitting module 214 as described above. These modules can be implemented as processing modules, software or firmware elements, processing instructions, or other processing logic embodying any one or more of the methodologies or functions described and/or claimed herein. The 3D image processing system 210, and the 3D image processing module 200 therein, can receive one or more image streams or image datasets from one or more cameras (block 205). As described above, the image datasets corresponding to original image frames from the cameras are provided to the deep learning module 212 of the 3D image processing module 200. The deep learning module 212 can learn the pixel coordinates of the 2D bounding box and all vertices of the 3D bounding box of an object in the image plane. The fitting module 214 can produce the 3D attributes of an object in an input image using geological information from a terrain map and camera information including camera calibration matrices with camera extrinsic and intrinsic matrices. The fitting module 214 can produce projected values of the eight points of the object in 3D space. The 3D attributes of an object can be provided as 3D object detection data 220 as output from the 3D image processing system 210, and the 3D image processing module 200 therein. The details of the processing performed by the 3D image processing module 200 are provided above.

Figure 22:
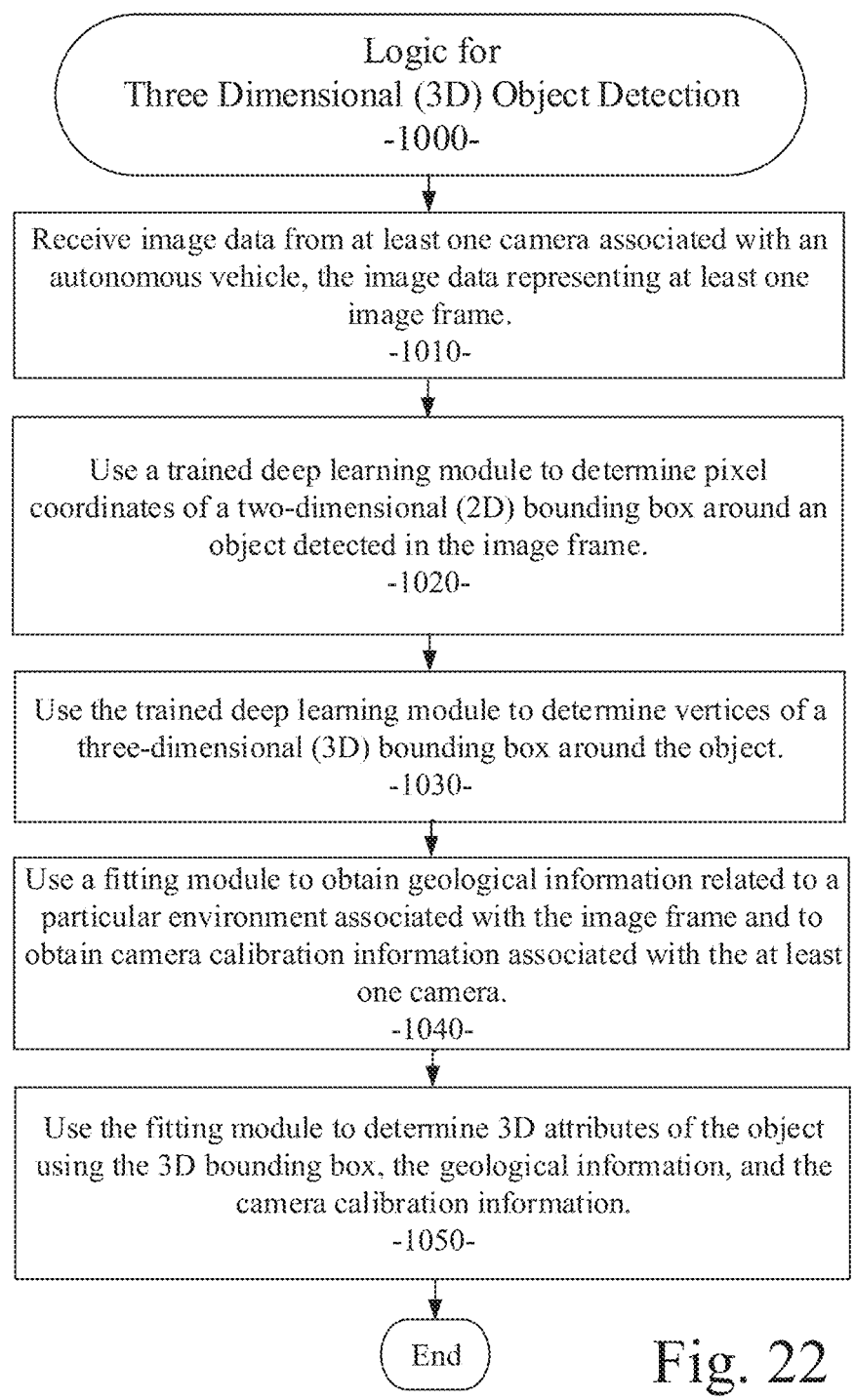
FIG. 22 is a process flow diagram illustrating an example embodiment of a system and method for 3D object detection.

Referring now to FIG. 22, a flow diagram illustrates an example embodiment of a system and method 1000 for image processing. The example embodiment can be configured to: receive image data from at least one camera associated with an autonomous vehicle, the image data representing at least one image frame (processing block 1010); use a trained deep learning module to determine pixel coordinates of a two-dimensional (2D) bounding box around an object detected in the image frame (processing block 1020); use the trained deep learning module to determine vertices of a three-dimensional (3D) bounding box around the object (processing block 1030); use a fitting module to obtain geological information related to a particular environment associated with the image frame and to obtain camera calibration information associated with the at least one camera (processing block 1040); and use the fitting module to determine 3D attributes of the object using the 3D bounding box, the geological information, and the camera calibration information (processing block 1050).

As used herein and unless specified otherwise, the term "mobile device" includes any computing or communications device that can communicate with the in-vehicle control system 150 and/or the 3D image processing module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the 3D image processing module 200 described herein to obtain read or write access to data signals, messages, or content communicated via any mode of interprocess or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the 3D image processing module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the 3D image processing module 200 can be implemented using systems that enhance the security of the execution environment, thereby improving security and reducing the possibility that the in-vehicle control system 150 and/or the 3D image processing module 200 and the related services could be compromised by viruses or malware. For example, the in-vehicle control system 150 and/or the 3D image processing module 200 can be implemented using a Trusted Execution Environment, which can ensure that sensitive data is stored, processed, and communicated in a secure way.

Figure 23:
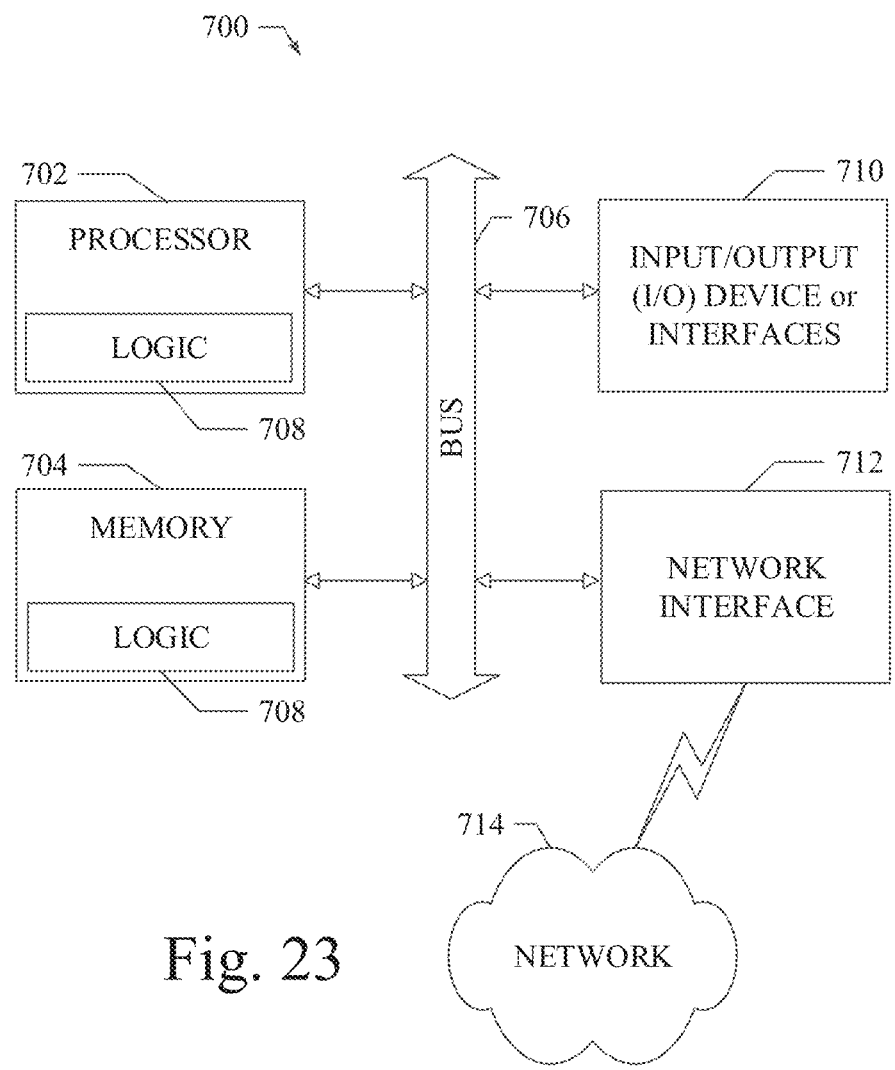
FIG. 23 shows a diagrammatic representation of machine in the example form of a computer system within which a set of instructions when executed may cause the machine to perform any one or more of the methodologies discussed herein.

FIG. 23 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor; and
   a 3D image processing system, executable by the data processor, the image processing system being configured to:
   receive image data from at least one camera associated with an autonomous vehicle, the image data representing at least one image frame;
   use a trained deep learning module to determine pixel coordinates of a two-dimensional (2D) bounding box around an object detected in the image frame;
   use the trained deep learning module to determine vertices of a three-dimensional (3D) bounding box around the object;
   obtain geological information related to a particular environment associated with the image frame;
   obtain camera calibration information associated with the at least one camera, wherein the camera calibration information comprises camera calibration matrices with a camera extrinsic matrix and a camera intrinsic matrix; and
   determine 3D attributes of the object using the 3D bounding box, the geological information, and the camera calibration information, wherein the 3D attributes of the object comprise a length, height, width, 3D spatial location, and heading of the object.

2. The system of claim 1 being further configured to provide the 3D attributes of the object to an autonomous driving perception system.

3. The system of claim 1 wherein the at least one camera comprises a camera lens of a type from the group consisting of: a wide-angle or close-range lens, a medium-range lens, and a long-range lens.

4. The system of claim 1 wherein the vertices of the three-dimensional (3D) bounding box around the object are determined in pixel coordinates.

5. The system of claim 1 wherein the geological information is obtained from a terrain map comprising global positioning system (GPS) locations with the height of the terrain.

6. A method comprising:
receiving image data from at least one camera associated with an autonomous vehicle, the image data representing at least one image frame;
using a trained deep learning module to determine pixel coordinates of a two-dimensional (2D) bounding box around an object detected in the image frame;
using the trained deep learning module to determine vertices of a three-dimensional (3D) bounding box around the object;
obtaining geological information related to a particular environment associated with the image frame;
obtaining camera calibration information associated with the at least one camera, wherein the camera calibration information comprises camera calibration matrices with a camera extrinsic matrix and a camera intrinsic matrix; and
determining 3D attributes of the object using the 3D bounding box, the geological information, and the camera calibration information, wherein the 3D attributes of the object comprise a length, height, width, 3D spatial location, and heading of the object.

7. The method of claim 6 wherein the 3D bounding box around the object is a cuboid in a 3D space.

8. The method of claim 6 wherein at least one of the 2D bounding box and the 3D bounding box is determined by deep learning method.

9. The method of claim 8 wherein the at least one of the 2D bounding box and the 3D bounding box is refined using Non-Maximum Suppression (NMS) method.

10. The method of claim 6 wherein the geological information is obtained from at least one of a global positioning system (GPS), an accelerometer, and a WiFi triangulation.

11. The method of claim 6 wherein the camera extrinsic matrix denotes coordinate system transformations from 3D world coordinates to 3D camera coordinates.

12. The method of claim 6 wherein the camera intrinsic matrix denotes coordinate system transformations from 3D camera coordinates to 2D image coordinates.

13. A non-transitory machine-useable storage medium embodying instructions which, when executed by a machine, cause the machine to:
receive image data from at least one camera associated with an autonomous vehicle, the image data representing at least one image frame;
use a trained deep learning module to determine pixel coordinates of a two-dimensional (2D) bounding box around an object detected in the image frame;
use the trained deep learning module to determine vertices of a three-dimensional (3D) bounding box around the object;
obtain geological information related to a particular environment associated with the image frame;
obtain camera calibration information associated with the at least one camera, wherein the camera calibration information comprises camera calibration matrices with a camera extrinsic matrix and a camera intrinsic matrix; and
determine 3D attributes of the object using the 3D bounding box, the geological information, and the camera calibration information, wherein the 3D attributes of the object comprise a length, height, width, 3D spatial location, and heading of the object.

14. The non-transitory machine-useable storage medium of claim 13 wherein the object is over 200 meters away from the autonomous vehicle.

15. The non-transitory machine-useable storage medium of claim 13 further configured to receive point cloud data from a laser range finder or a LIDAR associated with the autonomous vehicle.

16. The non-transitory machine-useable storage medium of claim 13 wherein the 3D bounding box has eight corners.

17. The non-transitory machine-useable storage medium of claim 13 wherein the geological information is obtained from a terrain map with the height of the terrain.

18. The non-transitory machine-useable storage medium of claim 13 wherein the length, height, and width have predefined bounds greater than 1 meter and less and 50 meters.

* * * * *